June 29, 1971 KEICHIRO HOZUMI 3,589,868
APPARATUS FOR QUANTITATIVE ANALYSIS OF A PARTICULAR
CONSTITUENT OF A SAMPLE
Filed June 19, 1967 2 Sheets-Sheet 1
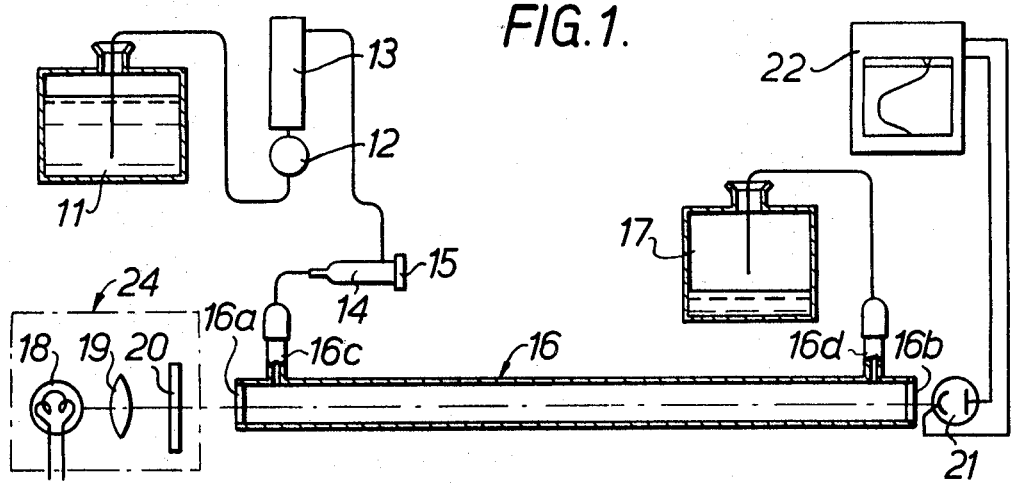
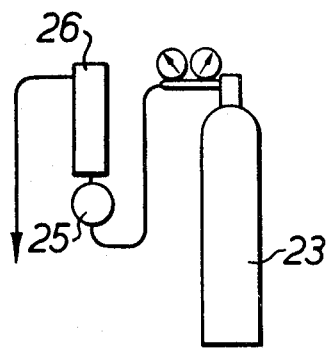
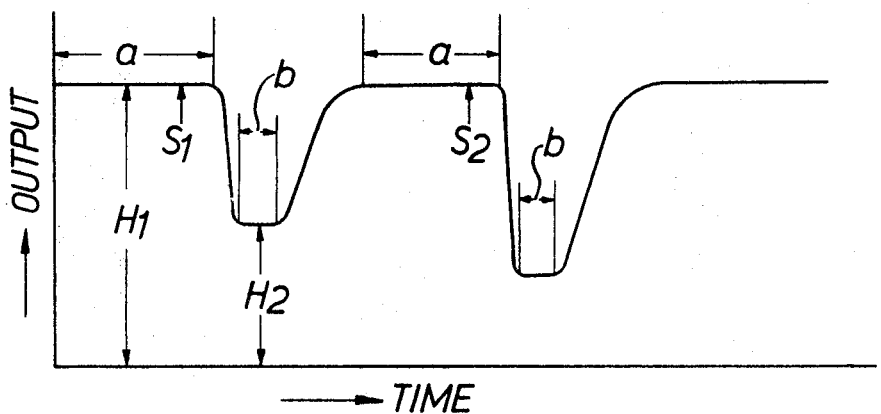
INVENTOR
KEICHIRO HOZUMI
BY
Morgan, Finnegan, Durham & Pine
ATTORNEY United States Patent Office 3,589,868
Patented June 29, 1971

3,589,868
APPARATUS FOR QUANTITATIVE ANALYSIS OF A PARTICULAR CONSTITUENT OF A SAMPLE
Keichiro Hozumi, Kyoto, Japan, assignor to Yanagimoto Manufacturing Co., Ltd., Kyoto, Japan
Continuation-in-part of application Ser. No. 605,266, Dec. 28, 1966. This application June 19, 1967, Ser. No. 647,095
Claims priority, application Japan, Dec. 29, 1965, 41/81,261, 41/81,262; June 21, 1966, 41/40,548
Int. Cl. G01n 21/26
U.S. Cl. 23—232     13 Claims

ABSTRACT OF THE DISCLOSURE

Apparatus for quantitative analysis of a particular constituent of a sample in which a fluid including a sample material continuously flows through an elongated light absorption cell disposed between a light source and photoelectric light receiving means. Apparatus for the measurement of the concentration of carbon monoxide contained in a sample gas in which carbon monoxide is oxidized by an iodine compound with the result of freeing iodine vapor therefrom and the free iodine vapor concentration is measured by the absorption photometry with use of a wavelength within the range of 480–580 m$\mu$.

---

This application is a continuation-in-part application of U.S. patent application Ser. No. 605,266 filed on Dec. 28, 1966 for "Apparatus for Quantitative Analysis of a Particular Constituent of a Sample."

This invention relates to apparatus for quantitative analysis of a particular constituent of a sample through the utilization of absorption photometry, and more particularly to apparatus for quantitative analysis by means of absorption photometry of carbon monoxide in a gaseous sample. The invention also finds its application in quantitative analysis of oxygen in an organic substance.

It is known to measure the concentration of a particular constituent of a sample through the utilization of absorption photometry. According to a conventional method, first, a mixture solution of the sample, as it is picked up or after being chemically reacted, with a solvent is prepared. A predetermined volume of the mixture solution is then measured off by a measuring flask. With the quantity of the particular constituent corresponding to the concentration of the mixture solution, a part of the solution is introduced into a light-absorbing cell in order to measure the concentration of the solution by means of absorption photometry. In the above conventional method, the dilution of a sample with a solvent to a predetermined volume and the sampling of a portion of the diluted solution for introduction to a light-absorption cell are carried out in stepwise operations.

The primary object of the invention is to provide a new and useful apparatus for quantitative analysis of a particular constituent of a sample which saves the trouble of carrying out, separately and by hand operation, the dilution of a sample and the sampling of the diluted solution and which accomplishes absorption photometry corresponding to the measurement of the total amount of a particular constituent continuously with astonishing rapidity with respect to a large number of samples.

Another object of the invention is to provide an improved apparatus for automatically recording an integral value of the concentration of a particular constituent in a sample, which is simple in construction, has little possibility of getting out of order, is applicable to solid, liquid and vapor samples, and allows separate quantitative analysis of mixed constituents and setting of sensitivity as desired.

A further object of the invention is to provide a new and improved apparatus for continuously measuring the concentration of carbon monoxide contained in the exhaust gas from car engines, mine gas or other contaminated atmospheres from the view point of environment sanitation.

A still further object of the invention is to provide a new and improved apparatus for quantitative analysis of oxygen in an organic substance in which the measuring and recording operations can be carried out with incomparably superior quickness and simplicity which have never been obtained hithertofore.

Apparatus for quantitative analysis of a particular constituent of a sample according to the invention comprises a light source at one end of an optical path, photoelectric light receiving means at the opposite end of the optical path adapted to convert light into electrical signals, an elongated light absorption cell arranged in the optical path and extending in its direction between the light source and the photoelectric light receiving means, the light absorption cell having an inlet and an outlet substantially at its opposite ends, respectively, means for continuously introducing and flowing a fluid including therein a sample material to be analyzed through the light absorption cell in the direction from the inlet to the outlet, and means for indicating and recording the output electrical signals produced at the photoelectric light receiving means.

In order to continuously measure the concentration of carbon monoxide in a gaseous sample, an iodine compound packed tube is used for oxidizing carbon monoxide in the sample gas with the result of freeing iodine vapor which is in turn introduced into the light absorption cell to determine the iodine vapor concentration by means of absorption photometry with use of a wave length within the range of 480–580 m$\mu$, preferably, 520–525 m$\mu$, at which the iodine vapor has an intense, absorption band. Among the iodine compounds which may be useful for such purpose as above there are iodine pentoxide and anhydrous iodate. The iodine compound packed tube and the light absorption cell are always maintained at about 120° C. so that the free iodine may be in a vapor phase.

Any oxygen contained in an organic sample can be detected and analyzed in the same manner as in the case of carbo monoxide after converting oxygen in the sample to carbon monoxide with use of a suitable oxidizing agent such as carbon granules. If the sample is a solid state, the sample is decomposed in a combustion tube before being introduced into the oxidizing agent.

The other objects and advantages of the invention will become apparent from the following detailed description in conjunction with the accompanying drawings in which:

FIG. 1 schematically illustrates the flow system and the optical system of an embodiment of the invention;

FIG. 1A illustrates a gaseous carrier supply which is to be substituted in the case of a gaseous flow system for the liquid carrier supply illustrated in FIG. 1;

FIG. 2 is a time versus light transmission diagram which is obtained with use of the apparatus illustrated in FIG. 1;

Figure 3:
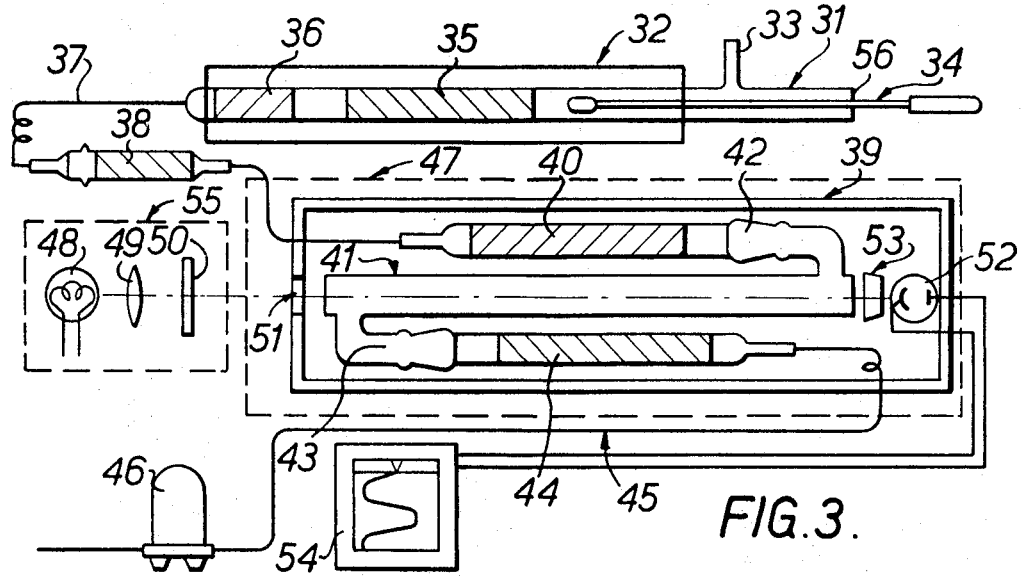
Figure 4:
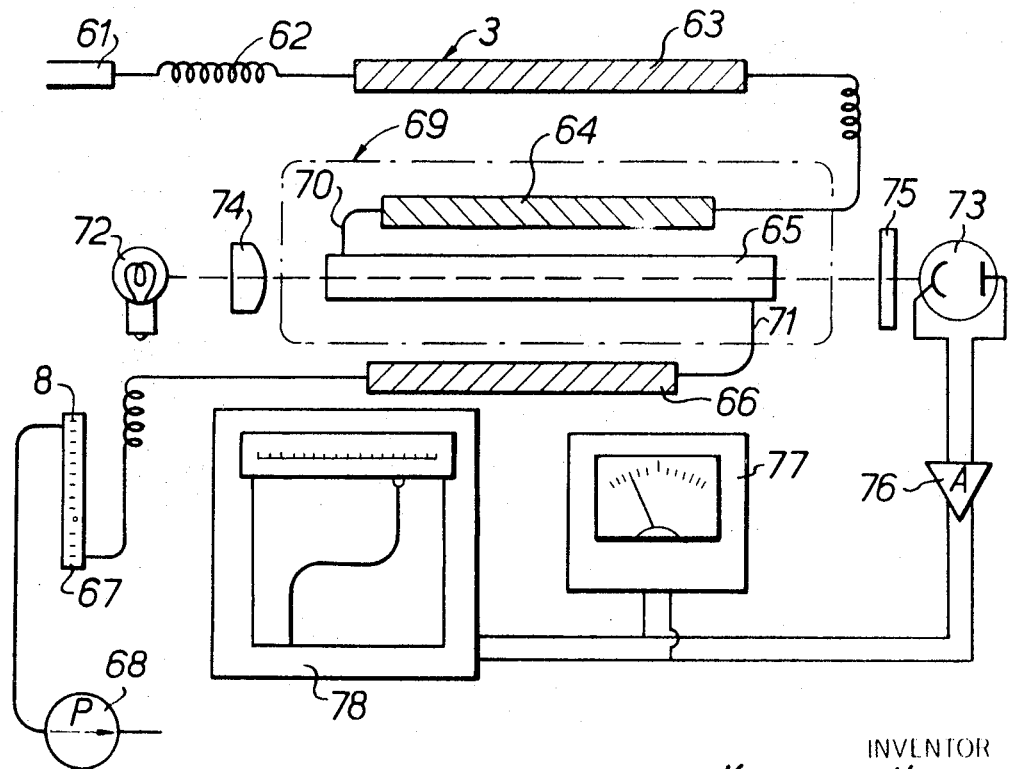

FIG. 3 schematically illustrates the flow system and the optical system of the apparatus for quantitative analysis of oxygen in an organic substance, as a modified embodiment of the invention; and FIG. 4 schematically illustrates the flow system and the optical system of the apparatus for continuously measuring the concentration of carbon monoxide contained in a gaseous sample such as the engine exhaust gas, mine gas or contaminated atmosphere, as a further modified embodiment of the invention.

Referring to the drawings, especially to FIG. 1, the reference numeral 11 designates a solvent reservoir; 12, a flow control valve; 13, flow meter; and 14 designates a sample introducing station closed with a rubber cap 15. The numeral 16 designates an elongated light absorption cell, the opposite ends of which are closed by optically flat glass plates 16a and 16b which form transparent windows. The material for the window glass plates 16a and 16b may be selected according to the wavelength to be used for the absorption photometry with respect to the particular constituent of the sample. Among the typical materials for the window glass plates there are Pyrex glass (Corning Glass Works), transparent, quartz and the like.

The light absorption cell 16 has an inlet 16c and outlet 16d near its opposite ends. The inlet 16c is connected through the sample introducing station 14, the flow meter 13 and a flow control valve 12 to the solvent reservoir 11, while the outlet 16d is connected to a recovery vessel 17 for solvent. A pump may be used for supplying the solvent from the solvent reservoir 11 to the light absorption cell 16, but this can be dispensed with if the solvent in the reservoir 11 has per se an ample potential energy with respect to the cell 16. A suction pump may also be inserted between the outlet 16d of the cell 16 and the recovery vessel 17 for effective discharge of the fluid from the cell.

The light absorption cell 16 is arranged in an optical path for absorption photometry. The optical system comprises a monochromatic light source, generally indicated as 24, at one end of the optical path, the above mentioned elongated light absorption cell 16 and photoelectric light receiving means 21 at the opposite end of the optical path. The monochromatic light source 24 which illuminates the system with one selected wavelength at a time may comprise an electric lamp 18, a condenser lens 19 and a filter 20 which allows only a selected single wavelength to pass therethrough. However, it should be noted that a monocrhomator of any known type is also useful as a substitute for filter 20. Photoelectric light receiving means 21 at the opposite end of the optical system is a photoelectric cell or tube where the light passing through the light absorption cell 16 is converted into an electrical signal. The light absorption cell 16 is arranged in the optical path between the light source 24 and photoelectric light receiving means 21 in such a manner that the length of the cell 16 extends along the direction of the optical path with the window glass plates 16a and 16b at the opposite ends of the cell 16 face the light source 24 and photoelectric cell 21, respectively.

The electric signals produced at the photoelectric cell 21 are transmitted to an electronic balancing recorder 22 to be indicated and recorded thereat.

In case a gas flow system is to be applied, the solvent reservoir 11 is replaced by a gas tank or bomb 23 as a carrier gas source as illustrated in FIG. 1A and the whole apparatus is thus modified to be adapted for such a gas flow system. The reference numerals 25 and 26 in FIG. 1A indicate a flow control valve and a flow meter, respectively, both inserted in the gas flow system. The carrier gas leaving the gas tank 23 and passing through the flow control valve 25 and the flow meter 26 enters into the sample introducing station 14 illustrated in FIG. 1 and is then introduced together with a gaseous sample into the light absorption call 16 from its inlet 16c. The carrier gas containing a gaseous sample is discharged from the absorption cell 16 at its outlet to the atmosphere. In the case of the gas flow system no recovery vessel 17 as illustrated in FIG. 1 is needed.

To operate the apparatus illustrated in FIGS. 1 and 1A, a solvent or carrier gas is flown through the flow path at a fixed slow speed, the lamp 18 is switched on and the filter 20, which is suitably selected in accordance with the particular constituent to be measured, is placed in position. The output signal of the light receiving means is indicated on the recorder 22 and the operator waits until this reference signal becomes stabilized.

A sample material is then introduced into the flow path at the sample introducing station 14. As for a solid sample, it is dissolved in a small amount of suitable solvent before being introduced into the flow path. The solvent may be either the same as or any other than the one used as the main flowing fluid or carrier, but it is desired to be such a kind that it shows no absorption at least at the wave length which is used and measured with the apparatus described. The solution of the sample thus prepared is taken in a syringe, if necessary, after a reaction reagent is added thereto. As for a liquid sample, it is either taken directly in a microsyringe or handled in the same way as in the case of a solid sample. Any gaseous sample can also be taken in a syringe or gas pipette. The sample fluid is then introduced into the sample introducing station 14 through the cap 16 so that the total amount of the sample fluid taken by a syringe or pipette is placed at a stroke in the flow path. The sample flows toward the light absorption cell 16 and shortly the total amount thereof enters into the light absorption cell 16 from the inlet 16c and begins to move in the cell 16 toward the outlet 16d along with the solvent or carrier gas.

It is essential to the present measuring apparatus that the total amount of sample should linger or be retained for a certain time in the light absorption cell 16. This can be achieved by using a relatively long cell 16 and a controlled slow flow speed.

In the case of the gas flow system involving a flow rate of 25 ml. per minute through the light absorption cell which has dimensions of 3 cm. in diameter and 40 cm. in length, for example, the duration in which the total amount of a certain kind of gas lingers or is retained in the light absorption cell 16 is abou 3 minutes considering the axial diffusion of the sample. Then the output signal which appears at the recorder 22 varies after the introduction of the sample $S_1$ or $S_2$ from the reference position which is optically 100% transmittance shown with a value of $H_1$ during the period of $a$ in FIG. 2 to the response position with value of $H_2$ during the period of $b$, the curve being leveled over the region corresponding to the lingering duration of the sample. When the sample being to flow out of the cell, the signal slowly moves back again to the reference position.

Supposing that the cell 16 is a straight pipe with an uniform diameter and the diffusion within the cell 16 is sufficiently effected in the rectangular section against the pipe axis, the light extinction $dI$, in a thin layer section with a thickness, $dx$, is proportional to the concentration of the constituent $c(x)$ in the section which is functional to the location within the cell. Thus, $$dI = -kIc(x)dx$$

where $k$ is the light absorption coefficient and I is the intensity of incident light. Therefore, $$\frac{dI}{I} = kc(x)dx$$

By integration over the entire region over which the constituent is distributed, the total light absorption through the cell can be calculated as follows:

$$\int \frac{dI}{I} = -k \int c(x) dx \tag{1}$$

On the other hand, the total constituent of the sample U existing in the cell is the summing up of the local amount of the constituent in the thin layer, $dx$, therefore, $$U = \int \pi r^2 c(x) dx = \pi r^2 \int c(x) dx \tag{2}$$

where $r$ is the inside radius of the cell.

From the Equation 1 and 2, it is indicated that the total light absorption is simply proportional to the total amount of the constituent as follows:

$$\int \frac{dI}{I} = -k \frac{U}{\pi r^2} \tag{3}$$

Suppose $I_o$ and $I_t$ as the intensities of incident light and the transmission light respectively, the Equation 3 may be converted to $$\int_{I_t}^{I_t} \frac{dI}{I} = \ln \frac{I_t}{I_o} = -k \frac{U}{\pi r^2}$$

where $I_t/I_o$ represents the light transmittance. Therefore, in FIG. 2 when the degree of light transmittance is found by measuring the height $H_1$ and $H_2$, instead of $I_o$ and $I_t$ respectively, the amount of the particular constituent of the sample introduced can be evaluated.

As mentioned above, the analyser of the present invention based upon the principle involving an optical integration of a constituent concentration which is ununiformly distributed within a long absorption cell is very simple in structure, has little possibility of getting out of order, is applicable to any of solid, liquid and gaseous samples, and allows selective quantitative analysis of mixed constituents and setting of sensitivity as desired by changing the cell diameter. Further, since the total amount is directly recorded on the recorder chart in terms of length, there is no need of performing troublesome area integration with respect to concentration-time which has been required with the conventional differential method.

FIG. 3 illustrates an application of the present invention to quantitative analysis of oxygen in an organic substance. Refering to FIG. 3, the numeral 31 designates an elongated combustion tube; 32, an electric furnace for heating the combustion tube; 33, an inlet for introducing a carrier gas into the combustion tube 31; 34, a sample inserting spoon, 35, a packed layer of carbon granules and 36 designates a packed layer of reduced copper. The tail end of the combustion tube 31 is connected through a metal capillary tube 37 to a sodium hydroxide-packed tube 38 which in turn communicates with an iodine pentoxide packed tube 40 in a thermostatic dark chamber 39 which is always maintained at a temperature of about 120° C. The iodine pentoxide packed tube 40 is fitted in a ground glass joint 42 situated at one end of an elongated, light absorption cell 41, which has another ground glass joint 43 at the other end thereof in which is fitted a tube 44 packed with an iodine removing agent such as silver granules. The above mentioned flow path communicates through a capillary tube 45 with an air pump 46, where suction of the carrier gas is effected. The thermostatic dark chamber 39 is retained in a casing 47 with a suitable heat insulator interposed therebetween.

The light absorption cell 41 is formed and arranged in an optical path in the same manner as described with reference to FIG. 1. The light source 55 at one end of the optical path comprises a lamp 48, a condenser lens 49 and a filter 50 which allows only a selected single wavelength to pass therethrough. The monochromatic light leaving the light source 55 enters through the window 51 into the thermostatic chamber 39, passes through the absorption cell 41 and in turn reaches photoelectric light receiving means 52 at the opposite end of the optical path. The photoelectric light receiving means is a silicone photocell and is provided with a hood 53. The output electrical signal produced at the photocell 52 is indicated and recorded by an electronic balancing recorder 54.

To operate the apparatus illustrated in FIG. 3, an inert gas such as nitrogen or argon is fed as the carrier gas through the inlet 33 and is allowed to consistently overflow from the opening mouth 56 of the combustion tube so that the entry of the atmosphere may be perfectly prevented. A part of the carrier gas introduced through the inlet 33 is sucked into the system by adjusting the air pump 46, so that it flows continuously through the combustion tube 31, sodium hydroxide-packed tube 38, iodine pentoxide-packed tube 40, light absorption cell 41 and iodine removing agent-packed tube 44. To give an example, the supply of the carrier gas is 100 ml. per minute while the suction of the air pump is 25 ml. per minute. Under this condition, the intensity of the light transmission through the light-absorption cell 41 is recorded on the recorder 54.

Next, a sample is placed on the sample inserting spoon 34, and the latter is then inserted through the opening 56 of the combustion tube 31 until the sample reaches a point just short of the inlet 33 where it is left for 15–20 seconds so that the air and moisture on the surface of the sample inserting spoon 34 are swept away. Thereafter, the inserting spoon is quickly pushed forward into the high temperature zone of the combustion furnace 32 as shown in FIG. 3 to allow the decomposition of the sample to take place. The decomposed gases come into contact with the carbon granules 35 to convert the oxygen in the sample all into carbon monoxide and, further, the decomposition of the carbonyl sulfide takes place on the reducer copper 36. At the sodium hydroxide-packed tube 38, the removal of the acidic gas is effected, while the neutral carbon monoxide passes here and is finally oxidized in the iodine pentoxide-packed tube 40. As the iodine freed at this time has been heated at 120° C. or thereabouts by the thermostatic dark chamber 39, it is introduced in the vapor phase along with the carrier gas into the light-absorption cell 41. The length of this light absorption cell is such that the total amount of the free iodine on the carrier gas can linger therein for 2–3 minutes while slowly traveling. For example, if the amount of flow of the carrier gas is 25 ml. per minute, the light-absorption cell is 3 cm. in inside diameter and 40 cm. in length. Since the maximum light absorption of iodine vapor is in the neighborhood of 520–525 m$\mu$, this must be taken into consideration in selecting the filter 50. When the iodine begins to flow into the light absorption cell 41, the intensity of transmission light 15 decreased, so that the corresponding decrease in the electric output of the photocell 52 is recorded on the recorder 54. When the total amount of iodine has entered into the light absorption cell 41, the intensity of light transmission becomes constant, so that the pen of the recorder 54 becomes temporarily stationary. The intensity of light transmission will again increase when the iodine proceeds in the light-absorption cell 41 until the vapor front of the iodine begins to come out from the side tube 43. And when all the iodine has been exhausted, the pen of the recorder 54 returns to the position which it assumed before the insertion of the sample. The movement of the pen recorder on the chart responds to the total amount of the iodine which has passed through the light-absorption cell 41 and therefore the iodine amount can be measured in a very simple way. In addition, the optical system in the present invention applies the principle of the optical integration of constituent concentration which has already been described before with reference to FIG. 1. The iodine exhausted from the light absorption cell 41 is absorbed and removed within the packed tube 44 having silver or sodium hydroxide granules therein.

As mentioned above, according to the present invention after the oxygen in an organic substance is converted into carbon monoxide it is reacted with iodine pentroxide and the iodine which forms at this time is introduced into a long, light absorption cell, the light absorption caused by the total amount of iodine being recorded on a recorder through a photocell, so that the oxygen content of the sample can readily be calculated from the movement of the pen on the recorder chart. Thus, the system according to the invention is incomparably superior in quickness and simplicity to the conventional methods according to which carbon monoxide is converted into carbon dioxide or iodine which is then absorbed by an absorption tube and the weight increase of the absorption tube is measured by means of a chemical balance.

The invention also finds its useful application in measuring the concentration of carbon monoxide which exists in the exhaust from car engines, mine gas or contaminated atmosphere. FIG. 4 illustrates a continuous analyzer for carbon monoxide according to the invention.

Referring to FIG. 4, the flow system comprises an intake 61 for a gas to be analyzed, a flexible conduit 62, a gas cleaning tube 63, an iodine pentoxide packed tube 64, an elongated light absorption cell 65, a sodium thiosulfate packed tube 66, a gas flowmeter 67 and a suction pump 68. The iodine pentoxide packed tube 64 and the light absorption cell 65 are placed within a thermostatic chamber 69 which is always maintained at a fixed temperature. The reference numerals 70 and 71 designate the inlet and outlet of the cell 65 at its opposite ends, respectively.

The light absorption cell 65 is arranged in an optical path in the same manner as the light absorption cells 16 and 41 illustrated in FIGS. 1 and 3 are arranged. The optical system includes a light source lamp 72 and a photoelectric tube or cell 73 at its opposite ends, respectively. The light leaving the lamp 72 is condensed by a condenser lens 74 and passes through the light absorption tube 65 and a filter 75 before reaching the photoelectric tube 73 to be converted thereat to an electrical signal which is transmitted via an amplifier 76 to a voltmeter 77 and/or an electronic recorder 78.

The operation of the apparatus illustrated in FIG. 4 for measuring the concentration of carbon monoxide in the engine exhaust gas is as follows:

The engine exhaust gas is introduced into the flow system at the intake 61. Nitrogen oxides, halogens, hydrogen sulfide which might exist in the gas traces or in slight amounts are removed from the gas at the cleaning tube 63 by means of a reagent such as lead dioxide or other substance useful for similar purposes contained therein. The gas leading the tube 63 contains carbon monoxide, carbon dioxide, a small amount of hydrogen and hydrocarbon and is introduced into the iodine pentoxide packed tube 64. The tube 64 is supported within the thermostatic-chamber 69 which is maintained at the temperature of 120° C. and here carbon monoxide is oxidized, giving off an equivalent amount of iodine. In the case wherein relatively high amounts of hydrogen and hydrocarbons are contained, it is advisable to use anhydrous iodate instead of iodine pentoxide in the tube 64. The iodine vapor given off in the tube 64 is led into the light absorption cell 6, so that the latter is filled with the gas having the iodine vapor concentration corresponding to the concentration of the carbon dioxide contained in the engine exhaust gas sucked in through the intake 61. The iodine vapor leaving the light absorption cell is removedf by means of the sodium thiosulfate in the tube 66 and the treated gas is continuously discharged into the atmosphere through the flowmeter 67 and suction pump 68.

Since the iodine vapor in the light absorption cell has an intense absorption band at a wavelength within the range of 480–580 $m\mu$, the peak intensity at a wavelength within the range of 520–525 $m\mu$. This can be accomplished either by using the filter 75 which allows only a single wavelength within such range to pass therethrough or by utilizing a monochromator at a position immediately after the light source. The photoelectric cell 13 produces electrical signals corresponding to variations in the light intensity received thereat. The electrical signals are in turn amplified by the amplifier and transmitted to the voltmeter 77 and the electronic tube recorder 78 with the result that the concentration of the carbon monoxide is indicated as the deivation of the pointer and as the trace of the pen on the recording paper, respectively.

According to the apparatus of the present invention, a carbon monoxide concentration having the order of 10–1,000 p.p.m. can be determined with extreme accuracy by means of an extremely simple mechanism as described above. Thus the apparatus is suitable as means for analyzing and regulating exhaust gases from engines, mine gases, city gases, flue gases and contaminated atmospheres. Further, the apparatus presents flexible features of applications in that by omitting the cleansing tube 3 or replacing the contents thereof by some suitable reagent the apparatus can be used for determining the concentration of sulfurous acid gas, hydrogen sulfide or other gases which will react with iodine pentoxide to give off iodine.

What I claim is:

1. Apparatus for the continuous determination of the concentration of carbon monoxide comprising:
    an elongated light adsorption cell having an inlet and an outlet;
    means for passing light at a particular wave length through the elongated light absorption cell;
    means for detecting and recording the light transmitted through the light absorption cell;
    a first tube arranged in series with the inlet of the light absorption cell containing an iodine compound which reacts with carbon monoxide to release free iodine;
    means to deliver carbon monoxide to said first tube having the iodine compound therein;
    means to deliver the free iodine from said first tube to the elongated light absorption cell; and
    a thermostatic dark chamber to maintain the first tube having said iodine compound therein and the light absorption cell as substantially 120° C.

2. Apparatus as in claim 1 further comprising a second tube having iodine removing agent arranged therein in series with the outlet of the light absorption cell, which cell is enclosed in the thermostatic dark chamber.

3. Apparatus as in claim 1 further comprising means to regulate the flow of fluid through the light absorption cell.

4. Apparatus as in claim 1 wherein the iodine compound in the first tube is iodine pentoxide.

5. Apparatus as in claim 1 wherein the iodine compound in the first tube is anhydrous iodate.

6. Apparatus as in claim 1 wherein the means for passing light at a particular wavelength through the elongated light absorption cell is a light source and a filter adapted to pass light having wavelengths of 480 $m\mu$ to 580 $m\mu$.

7. Apparatus as in claim 1 wherein the means for passing light at a particular wavelength through the elongated light absorption cell is a monochromator generating light having wavelengths of 480 $m\mu$ to 580 $m\mu$.

8. Apparatus as in claim 1 wherein the means for passing light at a particular wavelength through the elongated light absorption cell is a light source and a filter adapted to pass light having wavelengths of 520 $m\mu$ to 525 $m\mu$.

9. Apparatus as in claim 1 wherein the means for passing light at a particular wavelength through the elongated light absorption cell is a monochromator generating light having wavelengths of 520 $m\mu$ to 525 $m\mu$.

10. Apparatus for quantitative analysis of oxygen in an organic sample comprising:
    a combustion chamber to decompose the organic sample into constituent gases;
    means to convert the oxygen in the decomposed sample gases to carbon monoxide;
    means to mix the carbon monoxide with an inert carrier fluid;
    an elongated light absorption cell having an inlet and an outlet;
    means for passing light at a particular wavelength through the elongated light absorption cell;
    means for detecting and recording the light transmitted through the light absorption cell;
    a tube arranged in series with the inlet of the light absorption cell containing an iodine compound which reacts with carbon monoxide to release free iodine;
    means to deliver the carbon monoxide and inert carrier fluid to said first tube having the iodine compound therein;
    means to deliver the free iodine from said first tube to the elongated light absorption cell; and
    a thermostatic dark chamber to maintain the first cell having said iodine compound therein and the light absorption cell at substantially 120° C.

11. Apparatus as in claim 10 wherein the means to convert the oxygen in the decomposed sample gases to carbon monoxide is a tube of carbon granules arranged to receive the decomposed gases.

12. Apparatus as in claim 11 further comprising a tube of sodium hydroxide adapted to remove the acidic gases from the carbon monoxide prior to the entry of the carbon monoxide into the tube containing the iodine compound.

13. A method for continuous determination of the concentration of carbon monoxide comprising:
  fixing at a temperature of substantially 120° C. a flow assembly comprised of a tube containing an iodine compound which reacts with carbon monoxide to form free iodine and a light absorption cell which tube and cell are arranged in series;
  passing the carbon monoxide through the iodine compound to release free iodine therefrom;
  passing the free iodine released from the iodine compound through a light absorption cell;
  directing light at a wavelength between 480 m$\mu$ and 580 m$\mu$ through the light absorption cell onto a photocell to measure the light transmittance therethrough; and
  removing the iodine from the sample which has been measured.

References Cited

UNITED STATES PATENTS

| | | | |
|---|---|---|---|
| 3,322,504 | 5/1967 | Capuano | 23—254X |
| 3,420,636 | 1/1969 | Robbins | 23—232X |
| 3,451,779 | 6/1969 | Hozumi | 23—253 |

OTHER REFERENCES

Nelson et al., "Determination of Trace Amounts of Carbon Monoxide in Gaseous Hydrocarbons," Analytical Chemistry, vol. 29, No. 2, February 1957, pp. 180–183.

MORRIS O. WOLK, Primary Examiner

R. E. SERWIN, Assistant Examiner

U.S. Cl. X.R.

23—253, 254; 250—43.5, 47; 356—246